United States Patent [19]

Byron

[11] Patent Number: 4,740,974

[45] Date of Patent: Apr. 26, 1988

[54] OPTICAL AMPLIFIERS

[75] Inventor: Kevin C. Byron, Bishops Stortford, England

[73] Assignee: STC plc, London, England

[21] Appl. No.: 807,658

[22] Filed: Dec. 11, 1985

[30] Foreign Application Priority Data

Dec. 13, 1984 [GB] United Kingdom ............... 8431420

[51] Int. Cl.$^4$ .............................................. H01S 3/30
[52] U.S. Cl. ......................................... 372/3; 330/4.3
[58] Field of Search ........................... 350/96.16, 96.15; 372/3, 6, 43; 330/4.3; 307/425, 426, 427, 424

[56] References Cited

U.S. PATENT DOCUMENTS

| | | | |
|---|---|---|---|
| 3,515,897 | 6/1970 | Culver | 372/3 |
| 3,887,876 | 6/1975 | Zeidler | 330/4.3 |
| 4,136,929 | 1/1979 | Suzaki | 350/96.16 X |
| 4,401,364 | 8/1983 | Mochizuki | 350/96.16 |
| 4,638,483 | 1/1987 | Bowers | 372/43 X |
| 4,650,289 | 3/1987 | Kuwahara | 350/400 X |
| 4,652,079 | 3/1987 | Shaw et al. | 350/96.16 X |

FOREIGN PATENT DOCUMENTS

| | | |
|---|---|---|
| 0146262 | 6/1985 | European Pat. Off. . |
| 0084311 | 5/1982 | Japan ........................ 372/43 |
| 8606885 | 11/1986 | PCT Int'l Appl. .................... 372/6 |
| 1210597 | 10/1970 | United Kingdom . |
| 1408318 | 10/1975 | United Kingdom . |
| 2077909 | 8/1984 | United Kingdom . |
| 2151868 | 7/1985 | United Kingdom . |
| 2116391 | 8/1985 | United Kingdom . |

OTHER PUBLICATIONS

Stappaerts et al., "Garn Enhancement in Raman Amplifiers with Broadband Pumping", Optics Letters, vol. 5, No. 1, Jan. 1980, pp. 4–6.

Byron, "Raman Amplification ... 1.36 μm", Proceedings of 1984 European Conference on Optics, Optical Systems and Application, paper L5.

Byron, "Simultaneous amplification ... fibre", Electronics Letters, vol. 22, No. 24, pp. 1275–1277, Nov. 1986.

Edagawa et al., "Simultaneous amplification ... semiconductor lasers", Electronics Letters, vol. 23, No. 5, Feb. 1987.

M. Nakazawa et al., "Active Transmission line: Light Amplification by Backward-Stimulated Raman Scattering in Polarization-Maintaining Optical Fibre", *J. Opt. Soc. Am. B*, vol. 1, No. 1, Mar. 1984, pp. 80–85.

*Primary Examiner*—Eugene R. LaRoche
*Assistant Examiner*—Seung Ham
*Attorney, Agent, or Firm*—Kerkam, Stowell, Kondracki & Clarke

[57] ABSTRACT

An optical signal pulse to be amplified and a pump signal pulse are launched consecutively into one end of an optical fiber, which may comprise a separate fibre or part of a transmission line. The pulses differ in wavelength by one or more Stokes shift and the order of launch is determined by the relative group velocities in the fibre. Owing to dispersion in the fibre the pulses overlap and overtake one another while they are transmitted along the fibre, the signal pulse being amplified as a result of Raman stimulated emission and compressed as a result of power depletion from the pump pulse, thus increasing the bandwidth of the transmission line.

13 Claims, 1 Drawing Sheet

OPTICAL AMPLIFIERS

BACKGROUND OF THE INVENTION

This invention relates to optical amplifiers and in particular to optical fibre amplifiers in which an optical signal can be amplified optically by a pump signal to induce stimulated Raman scattering (Raman fibre amplifiers).

SUMMARY OF THE INVENTION

According to one aspect of the present invention there is provided an optical amplifier for amplifying an optical signal pulse, the amplifier comprising a length of optical fibre, a pump signal pulse source, the pump and optical signal pulse wavelengths differing by one or more Stokes shift, and means for launching the pump and optical signal pulses consecutively into one end of the fibre, the order of launching being determined by their relative group velocities in the fibre, the optical signal pulse being amplified and compressed, by depletion of power in the pump signal pulse, upon overlap of the pulses in use of the amplifier.

According to another aspect of the present invention there is provided a method of amplifying a first pulsed optical signal, which is of a first wavelength, comprising the steps of generating a pulsed pump signal, which is of a second wavelength, the first and second wavelengths differing by one or more Stokes shift, and launching the first pulsed optical signal and the pulsed pump signal consecutively into one end of a length of optical fibre, the order of launching being determined by their relative group velocities in the fibre, Raman stimulated emission in the fibre upon overlap of the pulse serving to induce gain in the first optical signal, the amplified first optical signal being of reduced pulse width owing to power depletion in the pump signal pulse.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
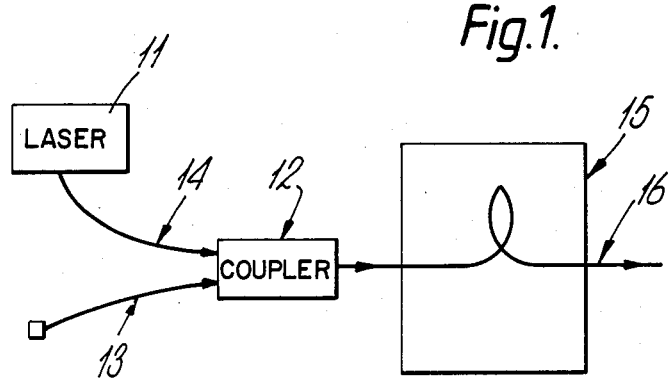
FIG. 1 shows, schematically, a Raman fibre amplifier.

Raman amplification in optical fibres is discussed in our co-pending GB Application No. 8333610, corresponding to U.S. Application Ser. No. 679,444, filed Dec. 7, 1984, and now continued as Ser. No. 888,274, filed July 22, 1986 in which is disclosed the basic optical amplifier structure shown in FIG. 1. It comprises a semiconductor laser 11 with appropriate drive circuitry to provide a pulsed output for use as a pump signal 14, a coupler 12 wherein an optical signal 13 to be amplified is coupled with the pump signal and a length of optical fibre comprising an amplifier fibre. When the wavelength of the signal 13 to be amplified is one Stokes shift away from that of the pump signal 14, amplification of signal 13 is obtained, the signal 16 output from fibre 15 being signal 13 as amplified. In the use of the amplifier described in the aforementioned Application the signals 13 and 14 are coupled synchronously to the amplifier fibre.

The present invention proceeds from our discovery that if the signal to be amplified is a pulsed signal and has a wavelength equal to the zero dispersion wavelength in the optical fibre transmission line along which it is to be transmitted, then pulse narrowing (compression) as well as amplification can be achieved, a result of which is increased bandwidth of optical fibre transmission systems. The amplifier may be a separate fibre or part of the transmission line. Such pulse compression is achieved by arranging that there is a varying amount of overlap between the signal and pump pulses as they propagate along the amplifier fibre and the mechanism involved will be described in greater detail hereinafter.

We initially believed, although the mechanism was not fully understood, that the pulse compression resulted from the pump signal having a finite dispersion since it is not at the wavelength of zero dispersion like the signal to be amplified, resulting in a relative delay for the pump signal. In the case of standard design silica fibre the zero dispersion wavelength (signal to be amplified wavelength) is 1.3 $\mu$m and requires a pump wavelength of 1.24 $\mu$m, the pulsed pump signal having a relative delay of 250 ps.km$^{-1}$. This delay was thought to result in the pulse compression since it means that the pump signal gradually slips further behind the signal pulse and that there is less overlap therebetween.

However, it has subsequently become apparent that this is not the correct mechanism and that is is not necessary for the signal pulse to be at the zero dispersion wavelength $\lambda_o$ of the fibre. Indeed, if the signal wavelength is not at $\lambda_o$ it will have a finite pulse spreading due to dispersion but this can be compensated for by the pulse compression, due to power depletion as described hereinafter, which occurs. Thus a better bandwidth can be obtained than that determined by the fibre itself as a linear transmission line.

In order to obtain amplification with pulse compression the pump and signal pulses are launched into the amplifier fibre at different times. The order of launching of the pump and signal pulses is determined by their relative group velocities in the fibre. If the relative spacing of the pump and signal wavelengths from the zero dispersion wavelength provides the signal pulse with the greater group velocity in the fibre then the pump pulse is launched first. If the converse is true then the signal pulse is launched first. As mentioned previously the difference in wavelength between the pump and signal pulses is arranged to be one Stokes shift. Owing to dispersion in the fibre the signal pulse and the pump pulse progressively overlap, due in the first mentioned case to the signal pulse catching up with the pump pulse, and the signal pulse is amplified. That is, the pump pulse and signal pulse overlap on transmission down the fibre and the signal pulse is amplified. The signal pulse gains power from the pump pulse, the pump pulse losing power to the signal pulse at the edge where the pulses first overlap. This sharpens up (compresses, reduces the width of) the pump pulse, which in turn sharpens up the signal pulse and so on until the pulses pass through each other. Thus it is the depletion of power in the pump pulse which causes the signal pulse to be compressed, as well as being amplified by acquiring power from the pump pulse.

The amplifier fibre, or the part of the transmission fibre acting as the amplifier fibre, provides a long interaction length, and is such that, i.e. of a dispersive material, the group velocities vary along its length and allows the pulses to overtake one another, thus providing the progressive overlap required to obtain pulse compression as well as amplification. Such a long interaction length provided by the fibre results in a long time of interaction and high levels of amplification are obtainable with relatively low pump power levels.

Figure 2:
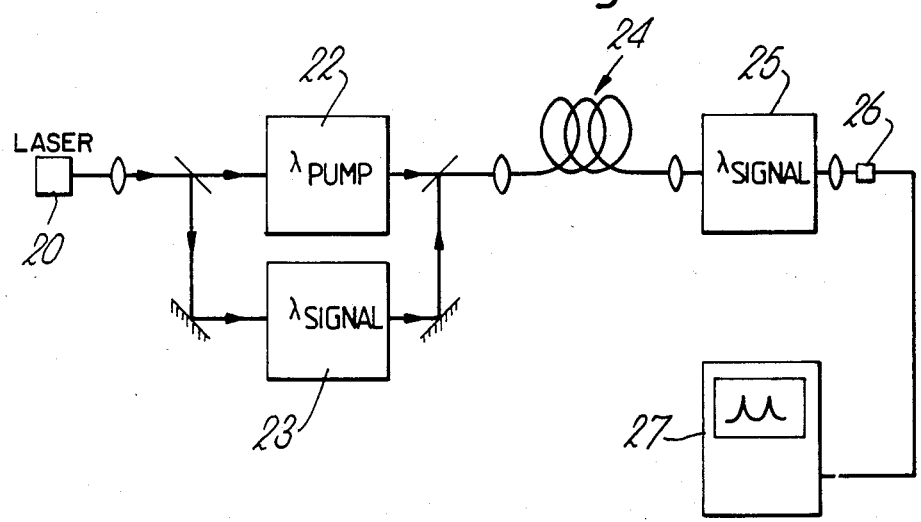
FIG. 2 shows an experimental arrangement employed to demonstrate pulse compression.

In an experimental arrangement (FIG. 2) to illustrate the simultaneous pulse compression and amplification in a single mode fibre, a pump pulse at a wavelength of 1.06 μm and a signal of identical pulse shape at a wavelength of 1.12 μm, derived from a common Raman fibre laser source 20 by monochromators 22 and 23, were focussed into a Raman fibre amplifier 24. The different path lengths for these pulses results in a 7.5 nsec lead of the pump pulse relative to the signal pulse. As the two pulses propagate down the fibre the longer wavelength signal pulse approaches the pump signal at a rate of 1.4 nsec/Km as a result of the fibre dispersion. For an amplifier fibre length of 7.8 Km, the signal pulse gradually overtakes the pump pulse and in doing so becomes amplified and compressed. The output of fibre 24 was applied to a monochromator 25 tuned to $\lambda_0$ signal and detected by a photodetector 26 prior to application to an oscilloscope 27. The effect of amplification and compression could be clearly seen.

Whereas the pulse compression can be achieved at signal wavelengths other than the zero dispersion wavelength, the best effect is achieved at $\lambda_o$ since there is no spreading due to dispersion offsetting the effect. In a practical arrangement the pump pulses may be provided by a semiconductor laser as in the aforementioned application.

ADVANTAGES PROVIDED BY THE INVENTION

Attenuation and dispersion in a single mode fibre transmission line may thus be simultaneously compensated for by using the transmission line as a Raman fibre amplifier, thus making unrepeated high bit rate long haul links a possibility.

I claim:
1. An optical amplifier for amplifying and compression an optical signal pulse, the amplifier comprising:
   a length of optical fibre,
   a pump signal pulse source,
   the pump and optical signal pulse wavelengths differing by one or more Stokes shift, and
   means for launching the pump and optical signal pulses consecutively into one end of the fibre, the order of launching being determined by their relative group velocities in the fibre,
   the optical fibre being a dispersive material whereby the group velocities of the pump and optical signal pulses vary and the pulses can progressively overlap, the optical signal pulse being amplified and compressed, by depletion of power in the pump signal pulse, upon progressive overlap of the pulses in use of the amplifier.

2. An optical amplifier as claimed in claim 1 wherein the optical signal pulse wavelength comprises the zero dispersion wavelength of the fibre.

3. An optical amplifier as claimed in claim 2, wherein the optical fibre is of silica, the optical signal pulse wavelength is 1.3 μm and the pump signal pulse wavelength is 1.24 μm.

4. An optical amplifier as claimed in claim 1 wherein in use pulse spreading of the signal pulse during transmission through the fibre is at least partially compensated for by said pulse compression.

5. An optical amplifier as claimed in claim 1 wherein the pump signal pulse source includes a semiconductor laser.

6. A optical amplifier as claimed in claim 1 wherein the fibre is of such a length as to allow the pulses to overlap one another completely.

7. A method of amplifying and compressing a first pulsed optical signal, which is of a first wavelength, comprising the steps of:
   generating a pulsed pump signal, which is of a second wavelength, the first and second wavelengths differing by one or more Stokes shift, and
   launching the first pulsed optical signal and the pulsed pump signal consecutively into one end of a length of optical fibre, the order of launching being determined by their relative group velocities in the fibre,
   the fibre being a dispersive medium wherein the group velocities of the first pulsed optical signal and the pulsed pump signal vary and the pulses can progressively overlap, Raman stimulated emission in the fibre upon progressive overlap of the pulses serving to induce gain in the first pulsed optical signal, the amplified first pulsed optical signal being of reduced pulse width owing to power depletion in the pump signal pulse.

8. A method as claimed in claim 7 wherein the first wavelength comprises the zero dispersion wavelength of the fibre.

9. A method as claimed in claim 7, wherein the pump signal is generated by a semiconductor laser.

10. A method as claimed in claim 7, wherein the fibre is of such a length as to allow the pulses to overtake one another completely.

11. An optical amplifier for amplifying and compressing an optical signal pulse, the amplifier comprising:
    a length of optical fibre,
    a semi-conductor laser pump signal pulse source, the pump and optical signal pulse wavelengths differing by one or more Stokes shift, and
    means for launching the pump and optical signal pulses consecutively into one end of the fibre, the order of launching being determined by their relative group velocities in the fibre,
    the optical fibre being a dispersive medium whereby the group velocities of the pump and optical signal pulses vary and the pulses can progressively overlap, the optical fibre being of such a length as to allow the pulses to at least partially overlap, the optical signal pulse being amplified and compressed, by depletion of power in the pump signal pulse, upon progressive overlap of the pulses in use of the amplifier.

12. An optical amplifier for amplifying and compressing an optical signal pulse, the amplifier comprising:
    a length of optical fibre,
    a pump signal pulse source,
    the pump and optical signal pulse wavelengths differing by more than one Stokes shift,
    the optical fibre being a dispersive material whereby the group velocities of the pump and optical signal pulses vary and the pulses can progressively overlap and pass through each other, and
    means for launching the pump and optical signal pulses into one end of the fibre such that there is progressive overlap between the signal and pump pulses as they propagate along the optical fibre and subsequent passing through each other of the signal and pump pulses, the optical signal pulse being amplified and compressed by depletion of power in the pump signal upon said progressive overlap and passing through one another of the pulses in use of the amplifier.

13. A method of amplifying and compressing a first pulsed optical signal, which is of a first wavelength, comprising the steps of:

generating a pulsed pump signal, which is of a second wavelength, the first and second wavelengths differing by one or more Stokes shift, and launching the first pulsed optical signal and the pulsed pump signal into one end of an optical fibre such that there is progressive overlap between the first optical signal and pump pulses as they propagate along the optical fibre and subsequent passing through each other of the first optical signal and pump pulses, the fibre being a dispersive medium whereby the group velocities of the first pulsed optical signal and the pulsed pump signal vary and the pulse can progressively overlap and pass through each other, Raman stimulated emission in the fibre upon progressive overlap of the pulses serving to induce gain in the first pulsed optical signal, the amplified first pulsed optical signal being of reduced pulse width owing to power depletion in the pump signal pulses.

* * * * *